United States Patent
Thomas et al.

(10) Patent No.: US 8,285,748 B2
(45) Date of Patent: Oct. 9, 2012

(54) PROACTIVE INFORMATION SECURITY MANAGEMENT

(75) Inventors: John S. Thomas, Colorado Springs, CO (US); Aravind Yalamanchi, Nashua, NH (US); Idriss Mekrez, Fort Washington, MD (US); Matt Topper, Ashburn, VA (US)

(73) Assignee: Oracle International Corporation, Redwood Shores, CA (US)

( * ) Notice: Subject to any disclaimer, the term of this patent is extended or adjusted under 35 U.S.C. 154(b) by 337 days.

(21) Appl. No.: 12/472,016

(22) Filed: May 26, 2009

(65) Prior Publication Data

US 2009/0300002 A1 Dec. 3, 2009

Related U.S. Application Data

(60) Provisional application No. 61/056,750, filed on May 28, 2008.

(51) Int. Cl.
*G06F 17/30* (2006.01)

(52) U.S. Cl. ........ 707/783; 707/713; 707/754; 707/765; 707/776

(58) Field of Classification Search .................. 707/1, 3, 707/5, 713, 759, 760, 761, 766, 771, 776, 707/781, 783, 784, 785, 754, 765
See application file for complete search history.

(56) References Cited

U.S. PATENT DOCUMENTS

| | | | |
|---|---|---|---|
| 7,243,097 B1 * | 7/2007 | Agrawal et al. | 1/1 |
| 7,516,128 B2 * | 4/2009 | Colby et al. | 1/1 |
| 7,647,298 B2 * | 1/2010 | Adya et al. | 707/999.002 |
| 7,680,862 B2 * | 3/2010 | Chong et al. | 707/753 |
| 7,685,194 B2 * | 3/2010 | Kabra et al. | 707/719 |
| 7,693,812 B2 * | 4/2010 | Lim et al. | 707/999.001 |
| 7,797,341 B2 * | 9/2010 | Castellanos et al. | 707/783 |
| 7,818,352 B2 * | 10/2010 | Krishnamoorthy et al. | 707/803 |
| 2006/0235823 A1 * | 10/2006 | Chong et al. | 707/1 |
| 2008/0313134 A1 * | 12/2008 | Lei | 707/2 |
| 2009/0132474 A1 * | 5/2009 | Ma et al. | 707/2 |

* cited by examiner

*Primary Examiner* — Dangelino Gortayo
(74) *Attorney, Agent, or Firm* — Hickman Palermo Truong & Becker LLP; Adam C. Stone.

(57) ABSTRACT

A method and apparatus for proactive information security management is described. In one embodiment, for example, a computer-implemented method for controlling access to sensitive information, the method comprising: maintaining access constraint data that can be used to control access to the sensitive information, wherein the access constraint data includes match pattern data and apply pattern data; receiving a semantic query from a querier requesting access to the sensitive information; based on the match pattern data, determining whether the semantic query should be constrained according to the apply pattern data; where said semantic query should be constrained according to the apply pattern data, rewriting the semantic query according to the apply pattern data to produce a rewritten query; executing the rewritten query against a database that contains the sensitive information; and returning any results of executing the rewritten query.

40 Claims, 7 Drawing Sheets employee:Susan :worksOn project:projectDOT   301

PROACTIVE INFORMATION SECURITY MANAGEMENT

CROSS-REFERENCE TO RELATED APPLICATION; BENEFIT CLAIM

The present application is related to and claims the benefit of priority of the following commonly-owned, provisional application: application Ser. No. 61/056,750, filed May 28, 2008, entitled "Proactive Information Security Management", of which the present application is a non-provisional application thereof. The disclosure of the foregoing application is hereby incorporated by reference in its entirety, including any appendices or attachments thereof, for all purposes.

FIELD OF THE INVENTION

The present invention relates to controlling access to sensitive information in information processing environments, and more particularly, to techniques for controlling access for the purpose of ingest, modification or distribution of sensitive information through the use of semantic model based access constraints in a data processing system, such as a database management system.

BACKGROUND

Sensitive Data

Computers are used to store and manage many types of data. Sensitive data is a common form of data that computers are used to manage. Sensitive data refers broadly to any data that represents non-public information that might adversely affect the privacy or security of a person or organization if revealed to persons who should not be trusted with the information. An information access policy is a statement of the conditions under which a particular user may access sensitive data. For example, a business may declare that an employee can only access project information about the projects he or she is assigned to.

Database Systems

Database management systems often implement information access policies by filtering data returned to a user in response to the user's request (e.g., query) for sensitive information from the database. Increasingly, businesses and organizations are storing sensitive data in databases managed by database management systems. Database management systems are often used to enforce information access polices because they are typically deployed as a software-based or hardware-based intermediary between the users of the system seeking access to sensitive data and the actual physical database itself (i.e., the sensitive data stored on a storage device). As an intermediary between users and sensitive data, database systems are suited to enforce mandatory access control.

When used to enforce information access policy on sensitive data, database management systems are typically deployed in either a two-tier client/server environment or in a three-tier client/server architecture. In a two-tier client/server environment, a client process receives a query from a user and connects directly to a database server process of the database management system. In such two-tier architectures, the database server process is capable of executing the user's query directly against the database. In a three-tier client/server architecture, the client process is indirectly connected to the database server process through an application process. In such three-tier architectures, the application process submits database queries to the database server process on the user's behalf.

In either case, whether the client process is connected directly to the database server process or connected indirectly through an application process, the database server process typically establishes database session data ("session data") that identifies the user of the system. Typically, the identity of the user is established when the user is authenticated. For example, the database server process may authenticate a user by comparing a username and password received from the user against a list of known usernames and passwords stored in the database.

Session data typically identifies a user of the system individually or by one or more roles or groups to which the user is associated. For example, session data may comprise a unique user identifier. In addition to or instead of a unique user identifier, session data may indicate one or more roles or groups assigned to the user such as, for example, "employee", "shareholder", or "vice-president". The database server process may store the session data in a computer memory for a period of time such as, for example, until the client process or application process disconnects from the database server process. When a query is executed, the database server process may use the stored session data to identify the user making the query. Having established the identity of the user making the query, the database server process may use that established identity to enforce information access policies that depend on the identity or role of the user.

Possible Approaches in Database Systems for Enforcing Information Access Polices One possible approach for a database management system to enforce an information access policy is to perform query rewriting. Generally, query rewriting is employed by a database system to achieve one or both of two objectives. One objective is to rewrite a user's query so that the rewritten query, when executed, returns the same result set as it would if it had not been rewritten but does so in a more efficient manner. A second objective is to rewrite a user's query so that the rewritten query, when executed, potentially returns a different result set than that originally intended by the querier. Query rewriting as described herein is generally refers to query rewriting performed to achieve the second objective.

Query rewriting is the process of intercepting and rewriting a user query so that the query, when executed against sensitive data, modifies/returns only the sensitive data that the user is permitted to access according to the information access policy. Typically, the query rewriting process limits access to sensitive data by adding additional query predicates to the user's query. For example, consider a relational database that stores employee records as rows in an 'Employee' table. The table may have 'employee_id' and 'salary' columns. A user may submit the Structured Query Language (SQL) query select * from Employee to retrieve all employee records. To enforce an information access policy specifying that employees may view their records only, a database management system may add the query predicate where employee_id=<user's_employee_id> to the user's query before the query is executed against the database so that the user obtains access to her employee record only. Similarly, the <user's_employee_id> may also be appended on an update request to restrict access to personal information, for example: update Employee set HOME_PHONE='555-123-4567'. The database management system may use session data to derive the value of <user's_employee_id> at the time the user's query is executed.

Often, the implementation of an information access policy in a database system is tightly coupled to the structure of the sensitive data stored in the database. For example, if sensitive data is stored relationally, then information access policies are typically implemented in terms of the tables and columns defined for the database. One problem with such tight coupling is that if there is a change to the metadata (e.g., table and column definitions) that defines the structure of sensitive data, then the implementation of the policy associated with the structure may no longer be effective. Thus, changing the structure of sensitive data may cause violations of information access policy if the implementation of the policy is not also changed when the structure is changed.

Another problem with typical approaches for implementing information access policies in database systems is that information access policies are often implemented as policy functions which are hand-coded by a security administrator and cannot easily change when there is a change to information access policy. A policy function is typically associated with a database structure and is invoked when a query attempts to access data contained in the structure. For example, a policy function may be associated with the table in a relational database and invoked when a query attempts to retrieve data from the table. Typically, the policy function, when invoked, returns any additional query predicates to be added to the user's query so that the user's query returns only data that complies with the information access policy. To determine the additional query predicates, the policy function may perform other tasks such as querying other tables in the database and mapping session data to the generated query predicates. Such policy functions can easily become quite complex with many conditional programming statements such as if-then-else statements including nested conditional programming statements. As such, complex policy functions can make it difficult for businesses and organizations to determine and demonstrate compliance with information governance regulations such as, for example, Sarbanes-Oxley and the Health Insurance Portability and Accountability Act (HIPPA). Further, such complex policy functions cannot easily be updated when information access policy is revised.

What is needed is an alternative implementation mechanism of information access polices for sensitive data in data processing systems. Ideally, the solution should allow the implementation of information access policies that are more loosely coupled to the storage structure of sensitive data and more easily facilitate the expression of complex information access polices, as compared with the usual approaches for implementing information access policies in data processing systems. These and other needs are addressed by the invention described herein.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

A method and apparatus for proactive information security management is described. In one embodiment, for example, a computer-implemented method for controlling access to sensitive information, the method comprising: maintaining access constraint data that can be used to control access to the sensitive information, wherein the access constraint data includes match pattern data and apply pattern data; receiving a semantic query from a querier requesting access to the sensitive information; based on the match pattern data, determining whether the semantic query should be constrained according to the apply pattern data; where said semantic query should be constrained according to the apply pattern data, rewriting the semantic query according to the apply pattern data to produce a rewritten query; executing the rewritten query against a database that contains the sensitive information; and returning any results of executing the rewritten query.

In another embodiment, for example, a system for controlling access to sensitive information, the system comprising: a processor; a memory coupled to the processor; and logic encoded in one or more computer readable media for: maintaining access constraint data that can be used to control access to said sensitive information, wherein said access constraint data comprises match pattern data and apply pattern data; receiving a semantic query from a querier requesting said sensitive information; determining, based on said match pattern data, whether said semantic query should be constrained according to said apply pattern data; where said semantic query should be constrained according to said apply pattern data, rewriting said semantic query according to said apply pattern data to produce a rewritten query; executing said rewritten query against a database that contains said sensitive information; and returning any results of executing said rewritten query.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Introduction

Figure 1:
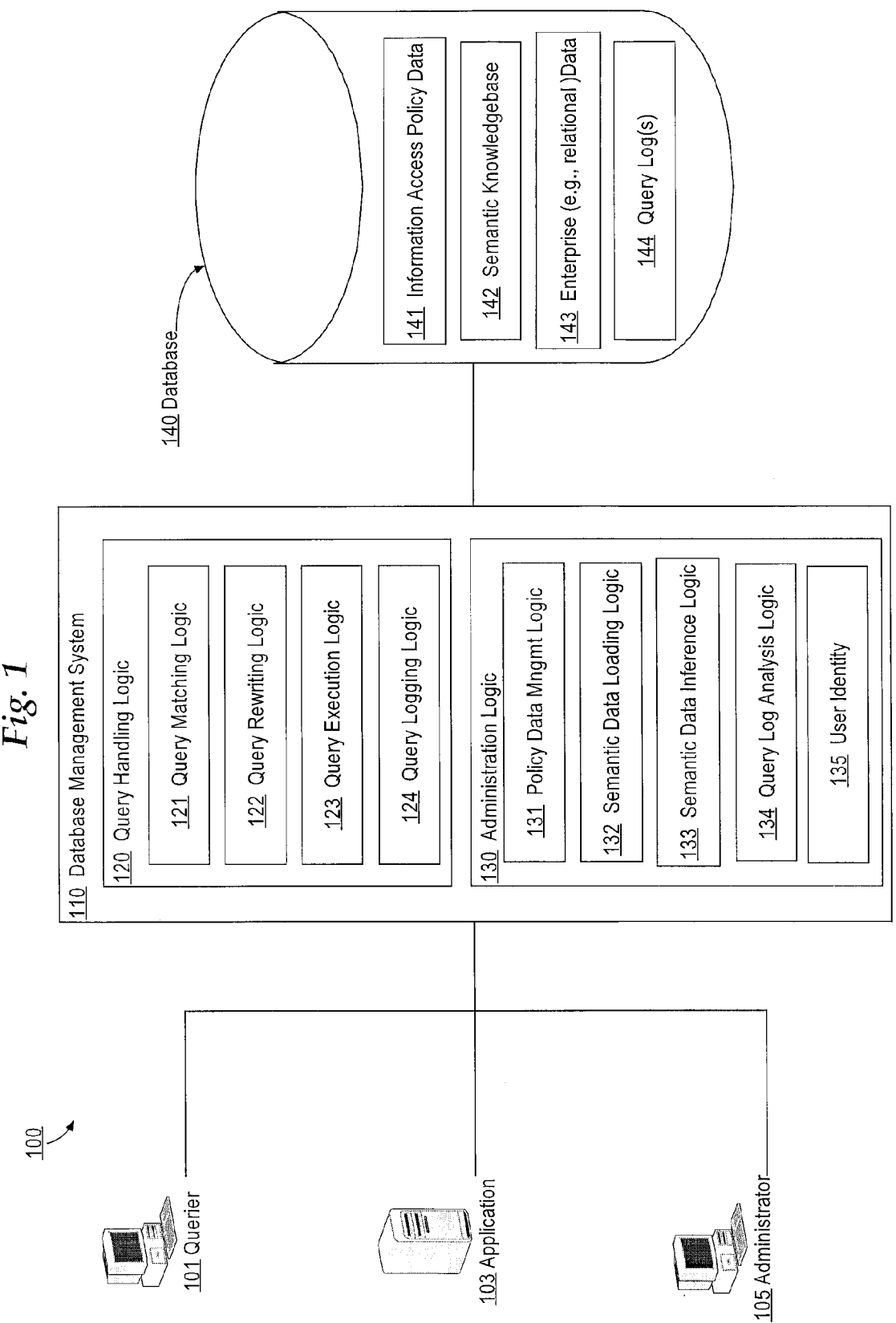
FIG. 1 is a block diagram illustrating an example operating environment.

A method and apparatus for proactive information security management is disclosed. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Reference in the following description to "one embodiment" or "an embodiment" means that a particular feature, structure, or characteristic described in connection with the embodiment is included in at least one embodiment of the invention. The appearances of the phrase "in one embodiment" or "in an embodiment" in various places in the following description are not necessarily all referring to the same embodiment.

Data Access→The term "data access" throughout this document pertains generally to the ability of a user or information processing environment to transfer information between information processing environments as well as modify, read, update or delete information in an information processing environment.

Query→The term "query" is used in this document to express generally the ability to access, retrieve, insert, modify, delete, update, or distribute information contained in an information processing environment.

Overview of Proactive Information Security Management (PRISM)

Techniques are described for controlling the ingest, modification, deletion, release and transfer of sensitive information through the use of access constraints on semantic models of the sensitive information in a data processing system, such as a database management system. In an embodiment, the techniques include maintaining one or more semantic models of sensitive information in a semantic knowledge database ("semantic knowledgebase"). The semantic knowledgebase may maintain the one or more semantic models by storing a collection of asserted or inferred semantic statements about the sensitive information.

A semantic statement is a declarative statement describing a thing or resource in terms of a property of the resource and a value for the property. A semantic statement may take the form of a subject-predicate-object expression understandable by a computer in which the subject refers to a resource, the predicate refers to a property of the resource, and the object refers to a value for the property. For example, the declarative statement 'Susan works on project DOT' is a semantic statement in which 'Susan' is the subject, 'works on' is the predicate', and project 'DOT' is the object.

The semantic knowledgebase may store many thousands or many millions of semantic statements. A collection of related semantic statements define an ontology or semantic model. Ontologies and semantic models are useful for providing a formalized specification of virtually any domain of knowledge such as, for example, in medical, government, finance, military and research domains. In one embodiment, semantic statements are expressed in a form understandable by a computer according to a format described in the Resource Description Framework (RDF) specification. RDF is a World Wide Web Consortium (W3C) authored specification the details of which can be found at http://www.w3.org/RDF/.

In RDF, Uniform Resource Indicators (URIs) are used to identify subjects, objects, and predicates. For example, the semantic statement 'Susan works on project DOT' could be expressed in RDF shorthand notation as:

employee:Susan:worksOn project:projectDOT

Sensitive information may be stored in any one of a number of formats. These formats may include file system, spreadsheet application, or relational database, for example. In one embodiment, the content and structure of these various forms of sensitive information storage are mapped via a semantic mapping layer into one or more semantic models that present a semantic view of the sensitive information. In one embodiment, access constraints are applied to the one or more semantic models that may be used to control access to the sensitive information stored in the various formats.

Once the sensitive information has been modeled or mapped in the semantic knowledgebase, the techniques include applying access constraints to the one or more semantic models of the sensitive information. Conceptually, a semantic model or ontology can be viewed as a labeled, directed multi-graph ("semantic graph") in which the subject and object of each semantic statement are nodes in the graph and the predicate of the semantic statement is a directed edge from the subject node to the object node. The techniques include applying access constraints to nodes and edges in the semantic graph that can be used to control access to sensitive information modeled by the semantic graph.

In an embodiment, an access constraint is expressed in a form understandable by a computer and includes a match graph pattern and an apply graph pattern. The match graph pattern is a graph pattern expression that indicates what nodes and edges in a semantic graph are protected by an access constraint that includes the match graph pattern. The apply graph pattern included in an access constraint is a graph pattern expression that specifies how to constrain user queries that, according to the match graph pattern included in the access constraint, are attempting to access protected nodes and edges. The user queries are modified according to the apply graph pattern in such a way that the queries, when executed against sensitive data, only access sensitive data that the user is permitted to access according to the access constraint. In one embodiment, match graph patterns and apply graph patterns are expressed in a form understandable by a computer using SPARQL Protocol and RDF Query Language (SPARQL) graph pattern expressions. SPARQL is a W3C authored specification the details of which can be found at http://www.w3.org/TR/rdf-sparql-query/.

In one embodiment, manipulation of data stored in a semantic graph comes in the form of deletion or insertion of a set of statements expressed as triples (subject-predicate-object combinations). Such statement-level operations are further abstracted into meaningful operations on the resources described in the semantic graph. For example, insertion of a statement, 'Project DOT is driven by department Dept1'-{project:ProjectDOT:drivenBy department:Dept1}, is an update to the description of the resource Project DOT. Access constraints for graph manipulation operations ensure that the appropriate match graph patterns are identified based on the effect the operation has on the graph and the corresponding apply graph patterns are used to restrict unauthorized manipulation of sensitive data.

In order to control access to the sensitive information, the techniques described herein include rewriting a user query that is subject to an access constraint to incorporate the apply graph pattern of the access constraint. The rewritten query, when executed against sensitive data, only allows access to sensitive data that the user is permitted to access according to the information access constraint. In one embodiment, the user queries are SPARQL queries requesting sensitive data through the semantic knowledgebase. Selected SPARQL queries are rewritten to incorporate the apply graph pattern of an access constraint which is itself expressed as a SPARQL graph pattern.

An organization's information access policies are likely to change over time to meet changing information needs within the organization. For example, it might be initial organizational policy to allow only a project lead to access budget information about the project. Later, it may become necessary for department vice presidents to access budget information about projects in order to execute their jobs effectively. Often, because of the large size of an organization, it is difficult for the organization to identify new information needs as they arise. Accordingly, techniques are disclosed for auditing user queries to determine who is asking for what sensitive information and then, based on that determination, updating access constraints on a semantic model to effectuate updates to information access policies. In one embodiment, auditing user queries is performed by analyzing historical query logs maintained by a database management system.

An organization also needs to understand the long term consequences information access by employees and other system users can have on the organization. Audit logs can also be used to build knowledge of the information a user, role or group has had access to in the course of daily operations, and enforce stricter information control policies based on historic queries. This knowledge added one more dimension to the match graph pattern information policy which is used to constrain access to sensitive information. Such a knowledge based constraint might let a standard user delete one user account an hour, and not more than 2 per day, but would never permit the repeated deletion of user accounts over an extended period.

In an embodiment, the apply graph pattern may be expressed as a dynamic access constraint that depends on session data associated with the user submitting the query. Dynamic access constraints are useful for enforcing information access polices that depend on the identity or role of the user requesting access to sensitive information, as well as a knowledge of the information previously distributed to a given individual, role or group. Examples of such information access policies are an employee can access only project information about the projects he or she works on, only a department's vice president can access information about the department's budget, and the vice president cannot see the project information, if he has had access to the quarterly reports within 4 weeks of the end of the quarter.

Example Operating Environment

FIG. 1 is a block diagram illustrating an example operating environment 100 in which an embodiment of the invention may be implemented. The exemplary operating environment 100 depicted in FIG. 1 is one of many possible operating environments in which an embodiment of the invention may be implemented and embodiments are not limited to a particular operating environment. Operating environment 100 is an example of a practical embodiment of the invention and should be regarded in an illustrative sense rather than a restrictive sense.

Environment 100 comprises database 140, database management system 110, querier 101, application 103, and administrator 105. Querier 101, application 103, and administrator 105 may be communicatively coupled to database system 110 via any sort of digital communication network such as, for example, a Local Area Network (LAN) or the Internet. Similarly, database system 110 may have access to database 140 through a digital communication network or may have more direct access to database 140 via a hardware bus, a storage area network (SAN), and the like.

Figure 6:
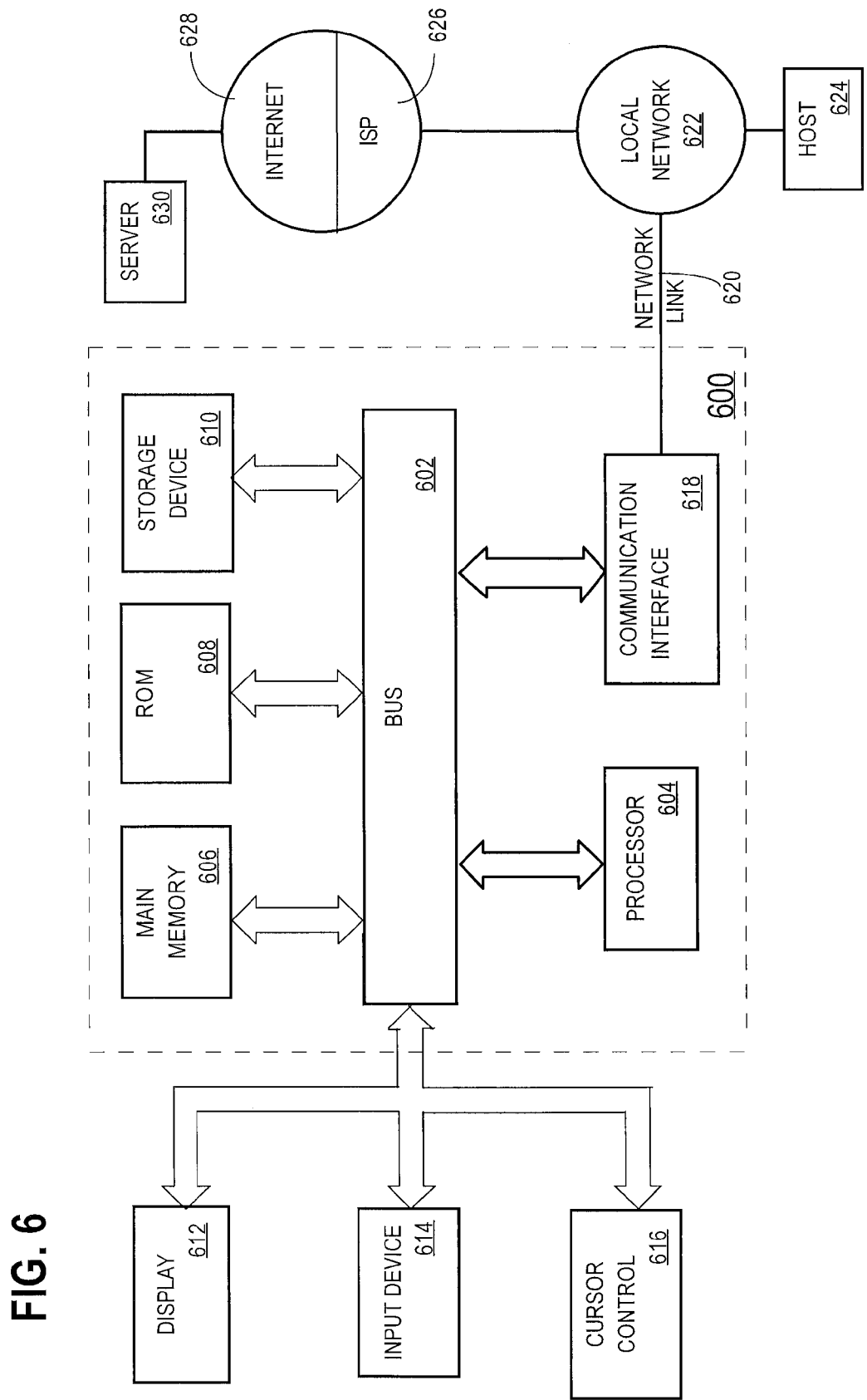
FIG. 6 is a block diagram of a computer system upon which an embodiment of the invention may be implemented.

Querier 101, application 103, administrator 105, database system 110, and database 140 may all be implemented by one computer system such as, for example, computer 600 depicted in FIG. 6. Alternatively, each of querier 101, application 103, administrator 105, database management system 110, and database 140 may be implemented by a separate computer system. Further, some combination of those components may be implemented by a single computer system. For example, database management system 110 and database 140 may be implemented by one computer system and querier 101, application 103, and administrator 105 may each be implemented by a separate computer system. Still further, each of those components may individually be implemented by more than one computer system. For example, database management system 110 may be implemented by a plurality of geographically distributed computer systems that are connected via a digital communication network such as a Wide Area Network (WAN) or the Internet.

Database 140 represents generally data structures for containing records or data within a volatile or non-volatile computer-readable medium. For example, database 140 may comprise one or more files stored on a hard disk or in random access memory (RAM) of a computing device. Database 140 may logically structure database data in a variety of manners and embodiments of the invention are not limited to any particular logical structure. For example, in one embodiment, database 140 is a relational database that logically structures database data relationally (i.e., in tables). However, other logical structures may be used such as, for example, hierarchical structures, object-relational structures, and flat-file structures.

Database 140 may also store database metadata (not shown) used for structuring and administrating database data. Database metadata may include, for example, metadata for defining the logical structure of database data (e.g., data for defining table and column definitions in a relational database), metadata for implementing transactions and concurrency control, and metadata for indexing, replicating, securing, and locking database data.

Database management system 110 represents generally any computing process for managing database 140. Database system 110 may be implemented by one or more special-purpose computing devices such as, for example, computer system 600 of FIG. 6. The special-purpose computing devices implementing database system 110 may be hard-wired to perform query handling logic 120 and administration logic 130, or may include digital electronic devices such as one or more application-specific integrated circuits (ASICs) or field programmable gate arrays (FPGAs) that are persistently programmed to perform query handling logic 120 and administration logic 130, or may include one or more general purpose hardware processors programmed to perform query handling logic 120 and administration logic 130 pursuant to program instructions in firmware, memory, other storage, or a combination. Such special-purpose computing devices may also combine custom hard-wired logic, ASICs, or FPGAs with custom programming to accomplish query handling logic 120 and administration logic 130. The special-purpose computing devices may be desktop computer systems, portable computer systems, handheld devices, networking devices or any other device that incorporates hard-wired and/or program logic to implement query handling logic 120 and administration logic 130.

Querier 101 represents generally a computer process, computer system, or user that requests access to sensitive information stored in database 140 by submitting a semantic query to database system 110. A semantic query is a database query capable of being executed against data that represents a semantic graph. An example of a semantic query is a database query formulated using SPARQL, SQL or similar query language. SPARQL queries are capable of being executed against data that represents an RDF graph.

In one embodiment, querier 110 formulates a query to submit to database system 110 using the SPARQL query language. For the purpose of illustrating clear examples, the example queries described herein use SPARQL query language syntax. However, querier 110 is not limited to formulating a query using only the SPARQL query language and querier 110 may use other query languages suitable for querying semantic graphs. This querier may insert, update, delete, read or transfer data from 140. Further, while FIG. 1 depicts only a single querier, in a practical embodiment there may be many hundreds or many thousands of queriers submitting queries to database system 110.

Application 103 represents generally an application computing process or computing system that uses or manages sensitive information stored in database 140 through database system 110 to provide one or more application services. Application 103 may perform the operations of querier 101 such as formulating and submitting semantic queries. Thus, wherever functionality performed by querier 110 is described herein, application 103 can be substituted to perform the same. Further, in three-tier architectures, querier 101 may submit queries to database system 110 through an application 103. While FIG. 1 depicts only a single application, in a practical embodiment there may be more than one application accessing data in database 140 through database system 110. Such applications may include applications for querying and modifying semantic knowledgebase 142 and enterprise data 143. Examples of such application include web services application, business process engineering applications, human resources applications, middleware applications, and the like. Further, application 103 may connect to other databases (now shown) that act as data sources for semantic knowledgebase 142 and enterprise data 143.

Administrator 105 represents a specialized application computing process or computing system for managing information access policy data 141. Administrator 105 refers to both a computing process or computer system for managing policy data 141 and also the human user using the computing process or computer system to manage policy data 141. In one embodiment, administrator 105 is specially trusted by an organization to manage information access policy data 141 in database 140. Administrator 105 may use an interface offered by database system 110 such as a graphical user interface, an application programming interface, or a network accessible interface for requesting and receiving administration services provided by administration logic 130 of database system 110.

PRISM Methodology

Figure 2:
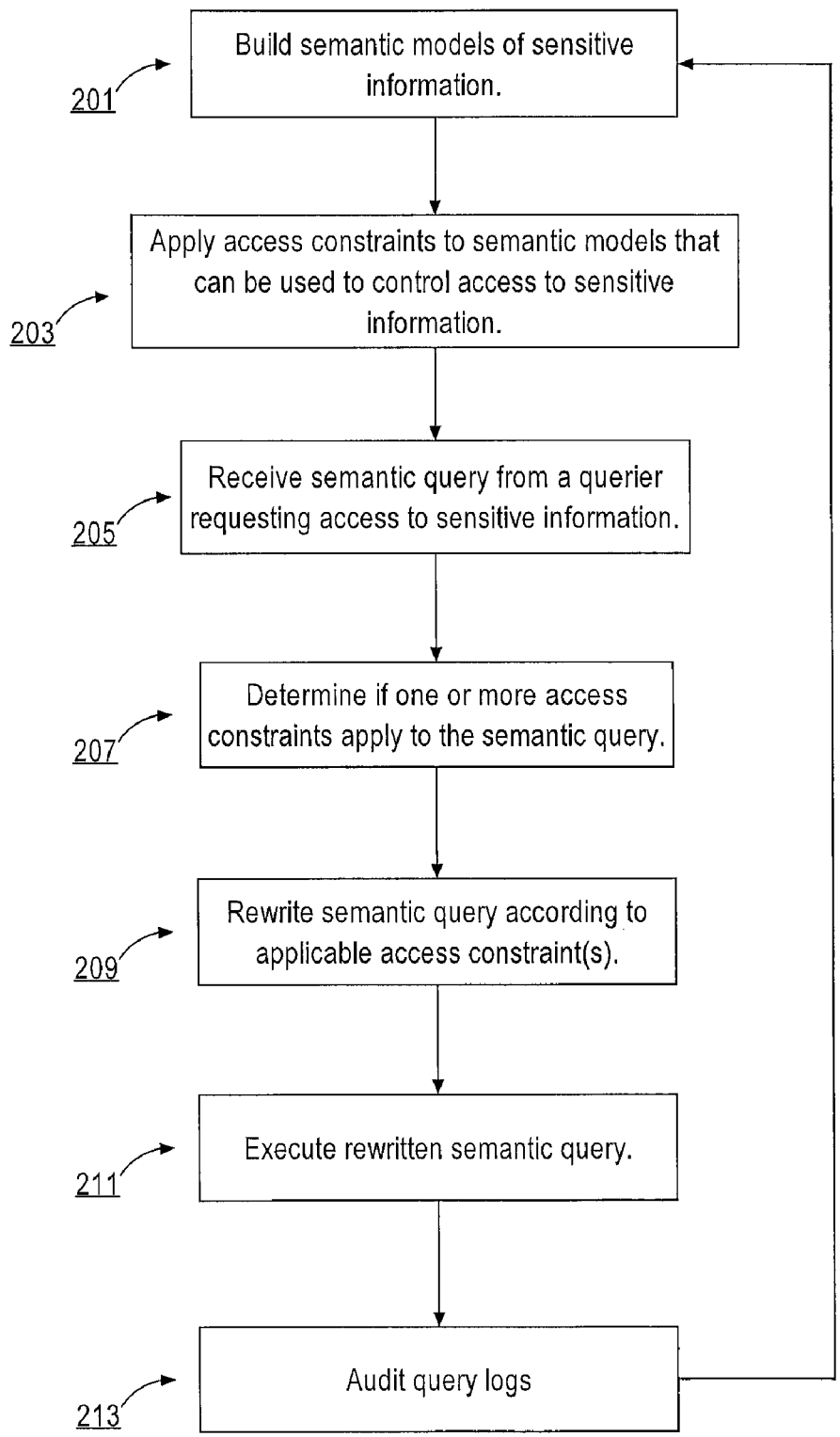
FIG. 2 is a flow diagram illustrating a process for proactive information security management.

FIG. 2 is a flow diagram illustrating a process 200 for proactive information security management according to an embodiment on the invention. Process 200 may be used by an organization as a cradle-to-grave approach for controlling access to sensitive information. Process 200 involves a semantic knowledgebase storing information access policy data that may encapsulate national and international law, administrative law such as, for example, the Health Insurance Portability and Accountability Act (HIPPA), corporate governance law such as, for example, Sarbanes-Oxley, organizational policies and procedures, and the like. Further, process 200 involves a fine-grained access control mechanism allowing an organization to restrict access to specific instances of sensitive information to specific users on a need-to-know basis. Additionally, process 200 involves the ability for an administrator to intuitively define access constraints in a declarative manner rather than requiring an administrator to hand-code custom software that enforces information access policy. Also, process 200 involves the ability to accommodate change to information access policy without having to modify the structure of sensitive data and without having to modify and redeploy custom software code.

Building Semantic Models and Ontologies (Semantic Data)

In step 201, database system 110 stores semantic data that represents one or more semantic models of sensitive information in semantic knowledgebase 142. A semantic model is also referred to herein as an ontology. An ontology is a formal specification of a domain of knowledge. Ontologies are useful to provide a shared understanding of the domain of knowledge. With respect to databases, an ontology may be defined from a collection of semantic statements. In a practical embodiment, an ontology may be comprised of many thousands or even many millions of semantic statements. Each semantic statement is a machine-understandable subject-predicate-object expression that identifies a resource within the domain of knowledge and describes the resource in terms of a property of the resource and a value for the property (which can also be another resource).

Each semantic statement can be conceptually represented as a directed graph of nodes ("semantic graph") in which the head node in the graph corresponds to a resource, the tail node corresponds to a property value, and the directed edge from the head node to the tail node corresponds to a property of the resource. A semantic graph of a single semantic statement is referred to herein as a basic semantic graph.

Figure 3:
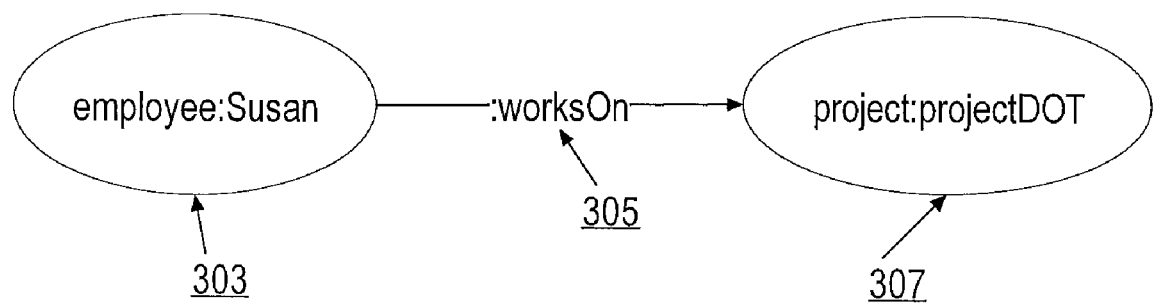
FIG. 3 is a block-diagram illustrating a basic semantic graph.

FIG. 3 is a block-diagram illustrating a basic semantic graph for the semantic statement 301. The basic semantic graph comprises head node 303, directed edge 305, and tail node 307. Head node 305 corresponds to the resource identified in the subject of semantic statement 301 (e.g., resource employee:Susan). Tail node 307 corresponds to the property value identified as the object in semantic statement 301 (e.g., project:projectDOT). And directed edge 305 from head node 303 to tail node 307 corresponds to the property identified in the predicate of semantic statement 301 (e.g., :worksOn).

Figure 4:
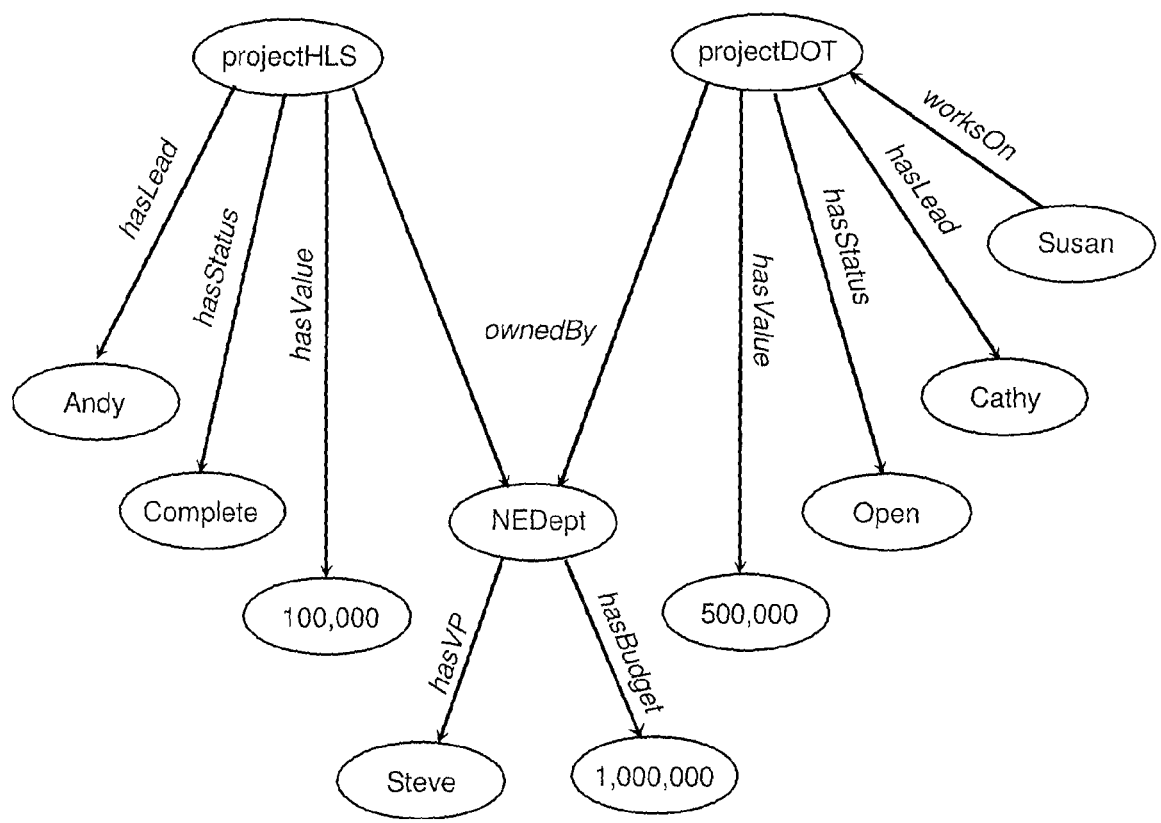
FIG. 4 is a block-diagram illustrating a semantic graph of a semantic ontology.

An ontology can be conceptually represented as a directed, multi-level graph ("semantic graph") composed of one or more basic semantic graphs. For example, FIG. 4 is a block-diagram illustrating an example semantic graph of the ontology defined by the collection of semantic statements listed in Table 1. For the purpose of illustrating clear examples, the semantic statements in Table 1 are expressed using RDF shorthand notation in which the token before the left most colon ':' refers to a namespace Uniform Resource Identifier (URI) and the token right of the colon identifies a resource or property within the identified namespace. The absence of a token to the left of the colon indicates a default namespace or that no namespace applies. The values in Table 1 are chosen arbitrarily for the purpose of illustrating an example ontology. Other notations for expressing a semantic statement in a machine-understandable form may be used and the invention is not limited to RDF notation or any other particular notation.

TABLE 1

| Resource (subject) | Property (predicate) | Property Value (object) |
|---|---|---|
| proj:projectHLS | :hasLead | emp:Andy |
| proj:projectHLS | :hasStatus | status:Complete |
| proj:projectHLS | :hasValue | "100,000" |
| proj:projectHLS | :ownedBy | dept:NEDept |
| dept:NEDept | :hasVP | emp:Steve |
| dept:NEDept | :hasBudget | "1,000,000" |
| proj:projectDOT | :ownedBy | dept:NEDept |
| proj:projectDOT | :hasValue | "500,000" |
| proj:projectDOT | :hasStatus | status:Open |
| proj:projectDOT | :hasLead | emp:Cathy |
| emp:Susan | :worksOn | proj:projectDOT |

Each node in graph of FIG. 4 represents either a resource or a property value and each directed edge in the graph represents a property of a resource. For example, the node labeled NEDept represents the resource NEDept and the directed arrow to the node labeled hasBudget indicates that resource NEDept has a property hasBudget which, in turn, has a property value of "1,000,000". As indicated by the previous example, property values can be literal values. Property values can also be resources. For example, the resource NEDept is a property value of the property ownedBy which is a property of the resource projectHLS.

According to one embodiment, administrator 105 builds one or more ontologies by loading, through database system 110, collections of semantic statements into semantic knowledgebase 142. Each ontology may be uniquely identifiable by an identifier or name that may be used, for example, by querier 101 to uniquely refer to the ontology. In one embodiment, to load collections of semantic statements into semantic knowledgebase 142, administrator 105 invokes semantic data loading logic 132 of database system 110. Semantic data loading logic 132 may be configured to receive semantic data in a wide variety of bulk data formats such as, for example, in eXtensible Markup Language (XML) format. Other approaches may be used to load semantic statements in semantic knowledgebase 142 and the invention is not limited to any particular approach for loading or storing data that represents semantic statements into semantic knowledgebase 142.

Inferring Semantic Statements

In addition to building an ontology by loading semantic data into semantic knowledgebase 142, an ontology may be extended through inference. An inferred semantic statement is a semantic statement that, according to an inference rule, necessarily follows from a given set of semantic statements to which the inference rule is applied. In one embodiment, semantic data inference logic 133 extends an ontology stored in semantic knowledgebase 142 by applying one or more inference rules to the semantic statements that comprise the ontology to derive one or more inferred semantic statements. In one embodiment, semantic data inference logic 133 adds inferred semantic statements to the ontology in semantic knowledgebase 142 from which the semantic statements were inferred. In another embodiment, semantic data inference logic 133 builds a separate ontology for inferred semantic statements that is separate from the ontology from which the semantic statements were inferred.

In one embodiment, an inference rule is identified by a name and consists of an antecedent graph pattern, an optional filter condition that further restricts the basic semantic graphs matched by the antecedent graph pattern, and a consequent graph pattern. The antecedent graph pattern of an inference rule is used to match one or more basic semantic graphs that comprise a semantic graph. For each matching basic semantic graph the variables in the antecedent graph pattern are bound to specific resources or resource values in the basic semantic graph. For example, the inference rule that a lead on a project is also a primary contact person for the project could be represented as follows using SPARQL graph patterns.

EXAMPLE INFERENCE RULE

| Antecedent Graph Pattern | ?p :hasLead ?e |
| Consequent Graph Pattern | ?p :hasPrimaryContact ?e |

Table 2 lists the basic semantic graphs of the semantic graph depicted in FIG. 4 that would match the example antecedent graph pattern given above.

TABLE 2

| Basic Semantic Graph | ?p bound to | ?e bound to |
|---|---|---|
| projectHLS hasLead Andy | projectHLS | Andy |
| projectDOT hasLead Cathy | projectDOT | Cathy |

For each matching basic semantic graph, the bound variables are applied as indicated in the consequent graph pattern to infer additional basic semantic graphs to add to the semantic graph. For example, Table 3 lists the additional semantic statements resulting from applying the example inference rule to the semantic graph depicted in FIG. 4.

TABLE 3

| Resource (subject) | Property (predicate) | Property Value (object) |
|---|---|---|
| projectHLS | hasPrimaryContact | Andy |
| projectDOT | hasPrimaryContact | Cathy |

An inference rule base is a collection of inference rules that may be applied to a semantic graph as a collection. One or more user-defined rules, such as the example user-defined rule above, may be collected in a rule base that is then applied to an ontology to derive inferred semantic data. In addition to user-defined rule bases, standardized rule bases such as, for example, the RDF Schema (RDFS) rule base may also be applied to ontologies stored in semantic knowledgebase 142 to infer semantic data. The RDFS rule base is described in detail at http://www.w3.org/TR/rdf-mt/.

Semantic Mapping Layer

According to one embodiment, in addition to or instead of building an ontology by loading semantic data into semantic knowledgebase 142 and extending an ontology through inference, in step 201, semantic mapping data maps enterprise data such as data stored into a relational database into one or more virtual semantic ontologies. Enterprise data refers broadly to any sensitive data and may include semantic data stored in a semantic knowledgebase and non-semantic data stored elsewhere (e.g., relational data stored in a relational database). Enterprise data can take a variety of formats including for example, data stored in other semantic data repositories, data stored in relational databases, data stored on file systems such as documents and files, and any data provided by one or more applications such as application 105 of FIG. 1. The semantic ontologies may be virtual in the sense that semantic data representing the enterprise data may not exist, although it may. Instead, semantic mapping data enables a database system such as database system 110 to map a semantic query to a manner of accessing the enterprise data using a native access mechanism associated with the enterprise data. For example, in one embodiment, semantic mapping data enables a database system to map a semantic query to a SQL query to access enterprise data stored in a relational database.

By mapping enterprise data into a virtual semantic ontology, the access constraints described herein can be used to control access sensitive information regardless of where or how the sensitive information is stored. In one embodiment, a database system such as database system 110 of FIG. 1 contains logic for rewriting a received semantic query to access enterprise data using a native access mechanism associated with the enterprise data. For example, consider the following semantic query that requests, from an OrderEntry semantic model, all customers of an order for an "Emitter".

| SELECT cust |
| FROM OrderEntry |
| WHERE { ?ol   rdf:type      :OrderLine . |
|         ?ol   :name         "Emitter" . |
|         ?ol   :forOrder     ?order |
|         ?order :hasCustomer ?cust } |

Further assume that the enterprise data is data stored in a relational database. That is, the actual order and customer data is stored in a relational database. According to an embodiment, a database system may rewrite the above example semantic query as the following SQL query:

```
SELECT o.customer
    FROM order o, order_line ol
    WHERE o.order_id = ol.order_id and
    ol.item_name = 'Emitter';
```

To aid a database system in rewriting a semantic query to a query that can access enterprise data (e.g., a SQL query), semantic knowledgebase 142 and/or information access policy data 141 may store semantic mapping data that specifies how to map resources, properties, and property values specified in a semantic query to enterprise data query constructs or access mechanisms. For example, returning to the above example, the semantic mapping data may contain data that specifies that the semantic property :name of a resource that is an instance of class :OrderLine maps to the item_name column on the order_line table and that the :forOrder property of a resource that is an instance of class :OrderLine maps to the order_id column on the order_line table.

According to one embodiment, schema semantic statements as described herein may be used to aid a database system in rewriting a semantic query to a query that can access enterprise data. For example, the range schema semantic statement :name rdfs:range xsd:string specifies that any property value of the property :name is of type xsd:string. As an additional example, the range schema semantic statement :forOrder rdfs:range :Order specifies that any property value of the property :forOrder is of resource class :Order.

Figure 5:
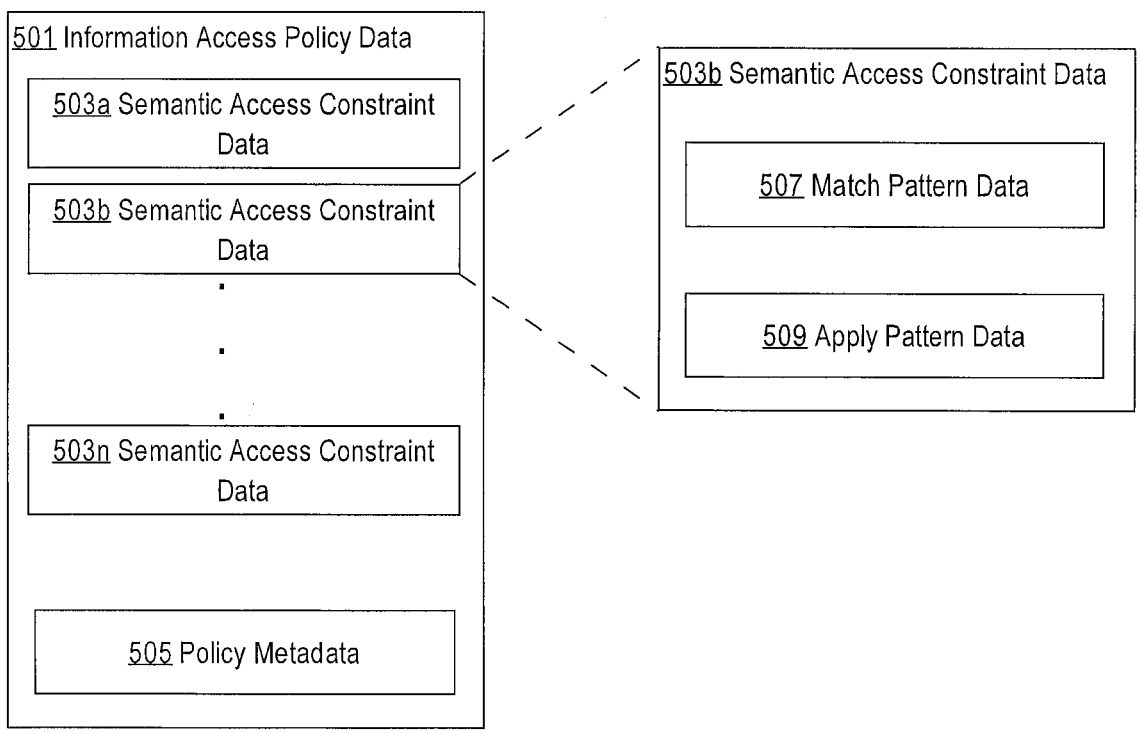
FIG. 5 is a block diagram illustrating information access policy data for use by a database system to control access to sensitive semantic data.

In one embodiment, an information access policy such as information access policy 501 of FIG. 5 is used to constrain access to sensitive enterprise data. According to the embodiment, in step 208 of process 200, a semantic query received by a database system is matched to an information access policy through a match pattern of an access constraint. Then, in step 209 of process 200, the database system rewrites the semantic query to access sensitive enterprise data using a native access mechanism associated with the enterprise data. In addition, the database system rewrites the semantic query to apply the apply pattern of the access constraint that was matched to the received semantic query. In one embodiment, the database system rewrites the semantic query to apply the apply pattern of the access constraint by first creating a rewritten semantic query that incorporates the apply pattern and then translating the rewritten semantic query to a native access mechanism associated with the enterprise data. In another embodiment, the database system translates the semantic query and the apply pattern directly to a native access mechanism associated with the enterprise data.

Figure 7:
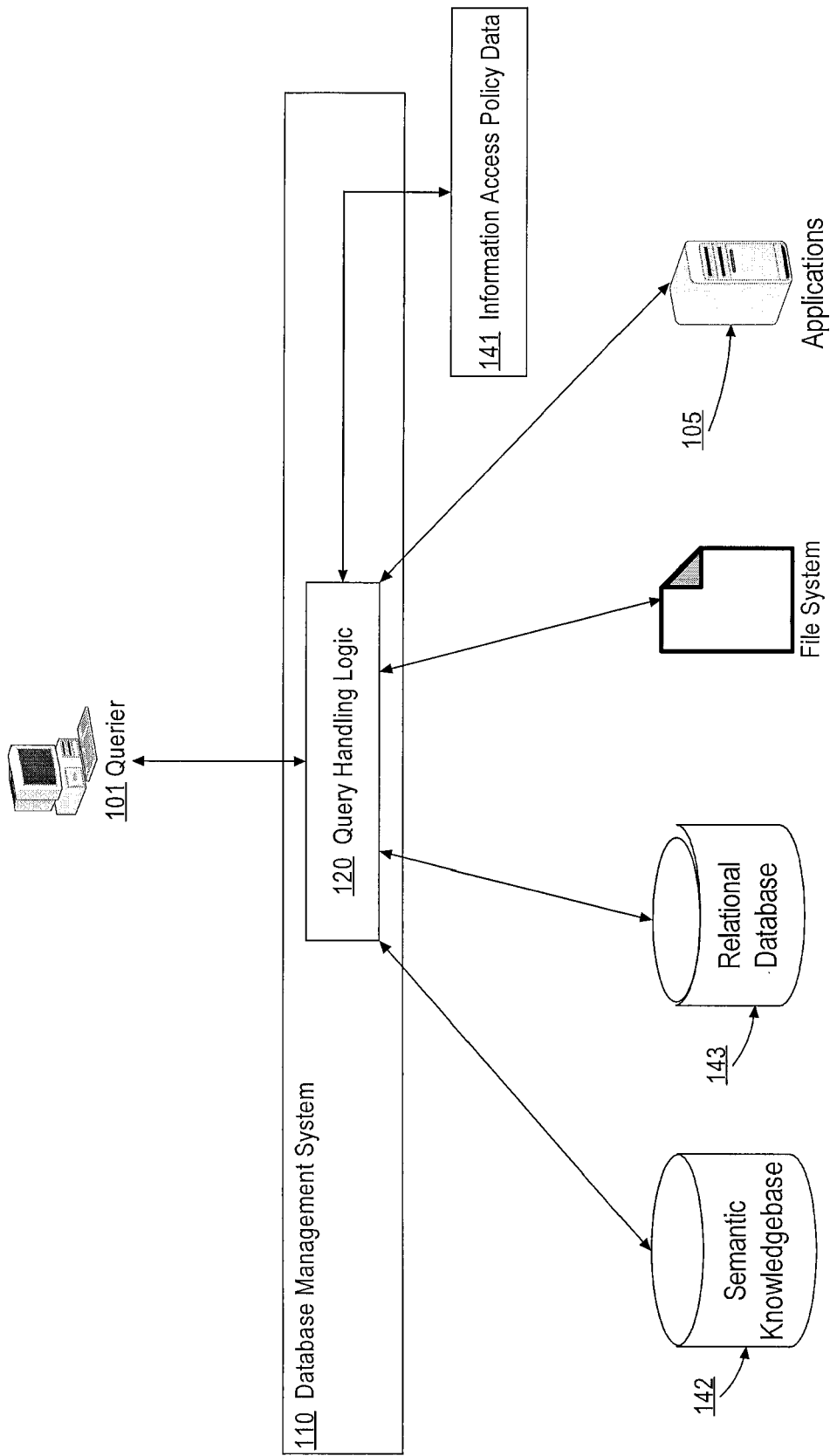
FIG. 7 is a block diagram illustrating a database system configured as a semantic mapping layer.

FIG. 7 is a block-diagram illustrating database system 110 when configured as a semantic mapping layer used to control access to sensitive information including sensitive enterprise data according to an embodiment of the invention. FIG. 7 shows database system 110 with access to enterprise data such as semantic knowledgebase 142, relational database 143, one or more file systems, and one or more applications 105. Database system 100 may access semantic knowledgebase 142 using a semantic querying language such as, for example, the SPARQL querying language. Database system 110 may access other enterprise data sources using native access mechanisms associated with the enterprise data sources. For example, database system 110 may access relational data 143 using the SQL query language. As another example, database system 110 may have access to application data through one or more application servers that communicate data with database system 110 through, for example, an object-querying language or through a network accessible application programming interface (API).

Information Access Policy

In step 203 of process 200, once sensitive information has been modeled as one or more ontologies in a semantic knowledgebase, such as semantic knowledgebase 142, data is stored in a database that may be used to constrain access to sensitive semantic data. In one embodiment, the data that is stored is information access policy data, such as information access policy data 141, that comprises one or more access constraints that are grouped into an information access policy and the policy is associated with a semantic ontology.

FIG. 5 is a block diagram that illustrates information access policy data for use by a database system, such as database system 110, to control access to sensitive semantic data according to an embodiment of the invention. Information access policy data may be associated with one or more semantic ontologies in a database such that when a database system receives a query requesting access to sensitive semantic data from the one or more information repositories 142, 143 the database system applies the access constraints of the associated information access policy to constrain what semantic data is accessed by the querier. As shown in FIG. 5, information access policy data associated with a semantic ontology comprises one or more semantic access constraints 503*a-n* and policy metadata 505. Each semantic access constraint comprises a match pattern and apply pattern. For example, FIG. 5 shows semantic access constraint data 503*b* comprising match pattern data 507 and apply pattern data 509. Information access policy data, such as information access policy data 501, and the associations between information access policies and semantic ontologies may be stored in a database, such as database 140.

Semantic Access Constraint

As shown in FIG. 5, each semantic access constraint of an information access policy comprises a match pattern and an apply pattern. In one embodiment, the match pattern and apply pattern are authored by an information access policy administrator, such as administrator 105. Match pattern data represents a semantic graph pattern expression that identifies one or more basic semantic graphs of a semantic graph that are protected by the semantic access constraint. Apply pattern data represents a semantic graph pattern that defines additional basic graph patterns to be applied against the one or more basic graph patterns protected by the match pattern before the identified one or more basic graph patterns are used to construct results to the user's query.

In one embodiment, semantic access constraints may be used to restrict access to basic graph patterns in a semantic graph based on:

a resource type (class), a property, and a property value.

Semantic Access Constraint Based on Resource Type (Class)

In one embodiment, a semantic access constraint may be authored that restricts access to one or more basic graph patterns in a semantic graph based on a resource type. A resource type is a defined class of resources. For example, resources projectDOT and projectHLS of FIG. 4 may be defined to be of class :Project.

In one embodiment, a semantic access constraint that restricts access based on resource class has the following general match pattern and apply pattern format:

Semantic Access Constraint—General Format 1

| | |
|---|---|
| Match Pattern: | { ?<variable> rdf:type :<class> } |
| Apply Pattern: | { ?<variable> :<property> :<property value> |

According to the match pattern of General Format 1, the semantic access constraint protects all basic graph patterns in a semantic graph in which the head node of the basic graph pattern is a resource of class :<class>. The apply pattern defines a graph pattern using the variable ?<variable> bound in the match pattern. Thus, the semantic access constraint specifies that a query attempting to access a resource of class :<classs> will be rewritten so that it accesses only those matched resources of class :<class> that have a property :<property> whose value is :<property value>.

In the general semantic access constraint formats described herein brackets <> are used for the purposes of illustration as placeholders to indicate the type of a parameter that would actually be specified in an actual semantic access constraint. The brackets are not required syntax for expressing valid semantic access constraints. Further, the notation rdf:type is RDF shorthand notation to indicate generally that the resource bound to variable ?<variable> is an instance of class :<class>. However, other notation that connotes the same meaning may be used and embodiments of the invention are not limited to RDF shorthand notation.

To illustrate a semantic access constraint that restricts access based on resource class an example is helpful. Consider the following example semantic access constraint that may be used to enforce the information access policy a querier may obtain information about an instance of a project only if the status of the project is open.

Semantic Access Constraint—Example 1

| | |
|---|---|
| Match Pattern: | { ?project rdf:type :Project } |
| Apply Pattern: | { ?project :hasStatus status:Open } |

Further consider the following SPARQL query submitted against the semantic graph illustrated in FIG. 4:

```
SELECT ?proj ?dept
WHERE
    { ?proj :ownedBy ?dept }
```

The above example query, when submitted against semantic data representing the semantic graph depicted in FIG. 4 and when not constrained by the semantic access constraint of Example 1, would return:

```
projectHLS NEDept
projectDOT NEDept
```

However, assume the semantic access constraint of Example 1 is associated with the ontology of FIG. 4 through an information access policy, the above query could be rewritten to include the apply pattern of the semantic access constraint of Example 1 as follows:

```
SELECT ?proj ?dept
WHERE
    { ?proj :ownedBy ?dept .
    { ?proj :hasStatus status:Open }
```

The rewritten query, when executed against the ontology of FIG. 4, would now return:
projectDOT NEDept The above example shows how a semantic access constraint may be used in a database system to enforce an information access policy. In particular, the example shows that match pattern and apply patterns of semantic access constraints may be declared in an intuitive manner using semantic graph pattern expressions.

Semantic Access Constraint Based on a Resource Property

In one embodiment, a semantic access constraint may be authored that restricts access to one or more basic graph patterns in a semantic graph based on a resource property. In one embodiment, a semantic access constraint that restricts access based on a resource property has one of the following general match pattern and apply pattern formats:

Semantic Access Constraint—General Format 2

| | |
|---|---|
| Match Pattern: | { ?<variable 1> :<match property> ?<variable 2> } |
| Apply Pattern: | { ?<variable 1> :<apply property> :<apply property value> } |

Semantic Access Constraint—General Format 3

| | |
|---|---|
| Match Pattern: | { ?<variable 1> :<match property> :<match property value> } |
| Apply Pattern: | { ?<variable 1> :<apply property> :<apply property value> } |

According to the match pattern of General Format 2, the semantic access constraint of General Format 1 protects all basic graph patterns in a semantic graph in which the directed edge involves property :<match property>. In the match pattern of General Format 2, the resources and literal values in the basic graph patterns bound to the variable ?<variable 2> are ignored for purpose of applying the match pattern.

The apply pattern of General Format 1 defines a graph pattern using the variable ?<variable 1> bound in the match pattern. Thus, the above semantic access constraint specifies that a query attempting to access a resource with property :<match property> will be rewritten so that it accesses only those matched resources that have a property :<apply property> whose value is :<apply property value>.

General Format 2 is a special case of General Format 1 in which the match pattern protects only those basic graph patterns in which the directed edge involves property :<match property> that has the property value :<match property value>. Thus, unlike in General Format 1, the resource property value specified in the match pattern is not ignored for the purpose of applying the match pattern.

In General Format 2, the :<match property value> can be either a resource or a literal value parameter. For example, the match pattern {?<variable 1> :hasValue "500,000"} would protect all basic graph patterns in a semantic graph in which the directed edge involves property :hasValue that has a property value of "500,000". As an additional example, the match pattern {?<variable 1> :ownedBy dept:NEDept} would protect all basic graph patterns in a semantic graph in which the directed edge involves property :ownedBy that has a property value of resource dept:NEDept.

To illustrate a semantic access constraint that restricts access based on a resource property consider the following example semantic access constraint that may be used to enforce the information access policy a querier may obtain information about the value of a project only if the project lead is Cathy.

Semantic Access Constraint—Example 2

| Match Pattern: | { ?project :hasValue ?val } |
|---|---|
| Apply Pattern: | { ?project :hasLead emp:Cathy } |

Further assume the following semantic query is submitted against semantic data that represents the semantic graph illustrated in FIG. 4:

| SELECT ?proj ?dept |
|---|
| WHERE |
| { ?proj :hasValue ?val } |

The above example query, when submitted against semantic data representing the semantic graph depicted in FIG. 4 and when not constrained by the semantic access constraint of Example 2, would return:

| projectHLS 100,000 |
|---|
| projectDOT 500,000 |

However, assume the semantic access constraint of Example 2 is associated with the ontology of FIG. 4 through an information access policy, the above query could be rewritten to include the apply pattern of the semantic access constraint of Example 2 as follows:

| SELECT ?proj ?val |
|---|
| WHERE |
| { ?proj :hasValue ?val . |
| { ?proj :hasLead emp:Cathy } |

The rewritten query, when executed against the ontology of FIG. 4, would now return:
projectDOT 500,000

Semantic Access Constraint Based on Property Value

In one embodiment, a semantic access constraint may be authored that restricts access to one or more basic graph patterns in a semantic graph based on a resource property value. In one embodiment, a semantic access constraint that restricts access based on resource property value has the following general match pattern and apply pattern format:

Semantic Access Constraint—General Format 4

| Match Pattern: | { ?<resource variable> :<match property> ?<value variable> .<br>FILTER (<filter expression>) } |
|---|---|
| Apply Pattern: | { ?<resource variable> :<apply property> :<apply property value> } |

In the match pattern of General Format 4, <filter expression> may be expressed in terms of either or both of ?<resource variable> or ?<value variable>. The filter expression may be used to further constrain the match pattern based on a boolean expression involving a variable in the match pattern. For example, the filter expression in the following example match pattern is expressed in terms of the ?value variable:

Match Pattern—Example 3

| Match Pattern: | { ?project :hasValue ?value .<br>FILTER( ?value > 100000) } |
|---|---|

In one embodiment, expressing a semantic access constraint based on a property value is accomplished using the SPARQL FILTER operator and an associated filter expression to further constrain the basic graph patterns protected by the match pattern. For example, without the FILTER operator and associated filter expression, the match pattern of Example 3 would protect all basic graph patterns having a directed edge involving the :hasValue property. With the FILTER operator and associated filter expression, the match pattern of Example 3 protects all basic graph patterns having a directed edge involving the :hasValue property and for which the value of the :hasValue property is greater than 100000. Basic graph patterns having a directed edge involving the :hasValue property and for which the value of the :hasValue property is equal to or less than 100000 are not protected the match pattern of Example 3.

To illustrate a semantic access constraint that restricts access based on a resource property value consider the following example semantic access constraint that may be used to enforce the information access policy a querier may only access information about a project's value that has a value over $100,000 if the lead on the project is Andy:

Semantic Access Constraint—Example 4

| Match Pattern: | { ?project :hasValue ?value .<br>FILTER( ?value > 100000) } |
|---|---|
| Apply Pattern: | { ?project :hasLead emp:Andy } |

The semantic access constraint of Example 4 restricts access to the :hasValue property of a resource capable of being bound to the ?project variable if the value of the :hasValue property of a bound resource is greater than 100000. In one embodiment, to enforce a semantic access constraint that is based on a resource property value, a user's query is rewritten to use the SPARQL OPTIONAL, BOUND and FILTER operators. For example, consider the following example query that attempts to retrieve a list of all projects and their values.

```
SELECT ?proj ?val
WHERE
    { ?proj :hasValue ?val }
```

The above example query, when submitted against semantic data representing the semantic graph depicted in FIG. 4 and when not constrained by the semantic access constraint of Example 4, would return:

```
ProjectHLS 100,000
ProjectDOT 500,000
```

However, assume the semantic access constraint of Example 4 is associated with the ontology of FIG. 4 through an information access policy, the above query could be rewritten to include the apply pattern of the semantic access constraint of Example 4 as follows:

```
SELECT ?proj ?val
WHERE
    { ?proj :hasValue ?val .
      OPTIONAL { ?proj :hasLead emp:Andy .
      ?bound orardf:let "1"^^xsd:boolean} .
      FILTER { ((?val > 100000) && BOUND(?bound)) || not(?val > 100000)) }
    }
```

The SPARQL OPTIONAL operator is used to indicate that a basic graph pattern may be a solution to a query even if the basic graph pattern does not satisfy the graph pattern expression of the OPTIONAL operator. If there are multiple graph pattern expressions specified to the OPTIONAL operator, each graph pattern expression is evaluated in the order specified until either all of the graph pattern expressions are satisfied or until evaluation of one of the multiple graph pattern expressions fails. Thus, in the rewritten query above, the variable ?bound will be set to "1" only if the resource bound to ?proj has the property :hasLead with a property value of emp:Andy.

The filter expression specified to the FILTER operator in the above rewritten query is constructed such that a basic graph pattern that matches the match pattern is considered a solution to a query only if the basic graph pattern also satisfies the apply pattern, and if the basic graph pattern does not match the match pattern, then the basic graph pattern is considered a solution to the query regardless if the basic graph pattern also satisfies the apply pattern. The SPARQL BOUND operator is used in the filter expression specified to the FILTER operator in the rewritten query to conditionally control the application of the apply pattern. For example, the filter expression specified to the FILTER operator in the above rewritten query will match a basic graph pattern if the value bound to the variable ?val is greater than 100000 and the variable ?bound is bound to value (which is only bound to a value if the resource bound to variable ?proj has the property :hasLead with a property value of emp:Andy). Alternatively, the filter expression specified to the FILTER operator in the above rewritten query will match a basic graph pattern if value bound to the variable ?val is less than or equal to 100000 regardless of the value of the :hasLead property of the resource bound to ?proj.

In the above example rewritten query, a semantic statement is used in the optional graph pattern expression to assign the literal value "1", which is of type xsd:boolean, to the variable ?bound. The variable ?bound is set to the literal value "1" when the resource bound to the variable ?proj has the property :hasLead with a value of emp:Andy. The property orardf:let is chosen arbitrarily for the purpose of explanation and is not required to bind the variable ?bound to a value and other properties may be used to achieve the same.

Information Access Policy Metadata

FIG. 5 shows that information access policy data 501 may also be associated with information access policy metadata 505. Policy metadata may be used by query handling logic of a database system, such as query handling logic 120 of database system 110, to aid in analysis of a user's semantic query. Specifically, policy metadata may be used to determine whether a user's query is attempting to access protected portions of a semantic graph as indicated by match pattern data of an access constraint.

Further, policy metadata may be used to avoid information access policy dependencies on metadata stored in a semantic knowledgebase and to avoid having to create metadata in the semantic knowledgebase. Additionally, policy metadata may be used to ensure that query handling logic of a database system has available to it the necessary information to enforce information access policies even when the necessary data is not present in the semantic knowledgebase itself. Thus, policy metadata enables information access policy data, such as information access policy data 141 of database 140, to be self-contained and portable with no external dependencies on a semantic knowledgebase such as semantic knowledgebase 142 of database 140.

In one embodiment, before query handling logic of a database system rewrites a user's query according to an apply pattern of an access constraint, the query handling logic determines, according to the match pattern of the access constraint, that the access constraint applies (i.e., matches) the user's query. For example, consider the semantic access constraint of Example 1. Further, assume the access constraint is included in an information access policy associated with a semantic ontology. Upon receiving a query attempting to retrieve data from the semantic ontology, query handling logic of a database system determines that the query is attempting to access a protected basic semantic graph. In one embodiment, query handling makes this determination based in part on policy metadata, such as policy metadata 505 of FIG. 5.

In one embodiment, policy metadata indicates schema information about the types of resources and the types of properties that exist in the one or more ontologies to which an information access policy is associated. The schema information is used by query handling logic to determine whether a match pattern of an access constraint applies to a user's query. In one embodiment, policy metadata may include: domain and range information for properties in the semantic graph, sub-class relationships of resources in the semantic graph, and sub-property relationships of properties in the semantic graph.

In one embodiment, domain and range information, sub-class relationships, and sub-property relationships are specified as semantic statements. Each of these types of semantic statements may be used to declare schema information about an ontology. For the purpose of a clear explanation, these types of semantic statements are referred to hereinafter as schema semantic statements. In one embodiment, a range schema semantic statement may be used to state that all values of a specified resource property are instances of a specified resource class. A domain schema semantic statement may be used to state that any resource that has a given resource property is an instance of a specified resource class. A sub-class schema semantic statement is used to state that all the instances of one resource class are also instances of another resource class. A sub-property schema semantic statement is used to state that all resources related by one resource property are also related by another resource property.

Range Schema Semantic Statement

In one embodiment, the following general form of the range schema semantic statement is used to state that all values of a specified resource property are instances of a specified resource class:
<resource property>rdsf:range<resource class>

For example, the following range schema semantic statement states that all values of the property :hasLead are instances of resource class :Employee.

Range Schema Semantic Statement—Example 5

:hasLead rdfs:range :Employee

In one embodiment, a range schema semantic statement is used to identify a resource class that could be bound to a variable specified in a basic graph pattern of a user's query. For example, consider the variable ?emp in the basic graph pattern { ?proj :hasLead ?emp} of the following example query:

```
SELECT ?proj ?emp
WHERE
    { ?proj :hasLead ?emp }
```

The range schema semantic statement of Example 5 could be used to determine that the variable ?emp can only bind to resources that are of class :Employee. This is because the range schema semantic statement of Example 5 states that all values of the property :hasLead are instances of resource class :Employee.

Domain Schema Semantic Statement

In one embodiment, the following general form of the domain schema semantic statement is used to state that any resource that has a given resource property is an instance of a specified resource class:
<resource property>rdfs:domain<resource class>

For example, the following domain schema semantic statement states that any resource that has the property :hasStatus is an instance of class :Project.

Domain Schema Semantic Statement—Example 6

:hasStatus rdfs:domain :Project

In one embodiment, a domain schema semantic statement is used to identify a resource class that could be bound to a variable specified in a basic graph pattern of a user's query. For example, consider the variable ?proj in the basic graph pattern {?proj :hasStatus ?status} of the following example query:

```
SELECT ?proj ?status
WHERE
    { ?proj :hasStatus ?status }
```

The domain schema semantic statement of Example 6 could be used to determine that the variable ?proj can only bind to resources that are of class: Project. This is because the domain schema semantic statement of Example 6 states that any resource that has the property :hasStatus is an instance of class :Project.

Sub-Class Schema Semantic Statement

In one embodiment, the following general form of the sub-class schema semantic statement is used to state that all the instances of one resource class are also instances of another resource class:
<resource class>rdfs:subClassOf<resource super-class>

For example, the following sub-class schema semantic statement states that all resources of class: GovtProject are also instances of resource class :Project. In other words, resource class :GovtProject is a sub-class of resource class :Project. Conversely, resource class :Project is a super-class of resource class :GovtProject.

Sub-Class Schema Semantic Statement—Example 7

:GovtProject rdfs:subClassOf :Project

In one embodiment, a sub-class schema semantic statement is used to identify that a resource that has been identified as a particular resource class by another schema semantic statement is also an instance of another resource class. Sub-class schema semantic statements enable an administrator to author a single semantic access constraint in terms of a resource class and have the access constraint apply to the resource class and sub-classes of the resource class. For example, consider the semantic access constraint of Example 8 which may be used to enforce the information access policy a querier can only access information about a project if the lead on the project is Cathy.

Semantic Access Constraint—Example 8

| Match Pattern: | { ?project rdf:type :Project } |
| Apply Pattern: | { ?project :hasLead emp:Cathy } |

Further, consider the following schema semantic statements as policy metadata associated with the semantic access constraint of Example 8:

Policy Metadata for Semantic Access Constraint—Example 8

| Domain Schema Semantic Statement: | :hasLead rdf:domain :Project |
| Sub-Class Schema Semantic Statement: | :GovtProject rdf:subClassOf :Project |

The domain schema semantic statement above states that a resource with the :hasLead property is an instance of resource class :Project. From this domain schema semantic statement, query handling logic of a database system, such as query handling logic 120 of database system 110, can determine that a query attempting to access the :hasLead property of a resource involves access to an instance of the resource class: Project. Accordingly, the query handling logic can apply the apply pattern of the semantic access constraint of Example 8 to any such query to enforce the information access policy. Further, from the sub-class schema semantic statement above, the query handling logic can determine that the semantic access constraint of Example 8 should also apply to a query attempting to access an instance of the resource class :GovtProject.

Sub-Property Schema Semantic Statement

In one embodiment, the following general form of the sub-property schema semantic statement is used to state that all resources related by one resource property are also related by another resource property:
<resource property>rdfs:subPropertyOf<resource property>

For example, the following sub-property schema semantic statement states that all resources related by the resource property :isInactiveMemberOf are also related by the resource property :isMemberOf.

Sub-Property Schema Semantic
Statement—Example 9

:isInactiveMemberOf rdfs:subPropertyOf
:isMemberOf

In one embodiment, a sub-property schema semantic statement is used to identify that a semantic access constraint that protects a particular resource property also protects another resource property. Sub-property schema semantic statements enable an administrator to author a single semantic access constraint in terms of a resource property and have the access constraint apply to the resource property and sub-classes of the resource property. For example, consider the semantic access constraint of Example 10 which may be used to enforce the information access policy a querier may obtain information about what organization a person is a member of only if the status of the organization is non-profit.

Semantic Access Constraint—Example 10

| Match Pattern: | { ?person :isMemberOf ?org } |
| Apply Pattern: | { ?org :status :NonProfit } |

Query handling logic of a database system, such as query handling logic 120 of database system 110, can determine from the match pattern of the semantic access constraint of Example 10 that a query attempting to access the resource property :isMemberOf is to be modified according to the apply pattern of the semantic access constraint of Example 10. Further, from the sub-property semantic access constraint of Example 9, the query handling logic can also determine that a query attempting to access the resource property :isInactiveMemberOf is to also be modified according to the apply pattern of the semantic access constraint of Example 10.

In the above example schema semantic statements, RDF schema notation is used to indicate the range, domain, sub-class, and sub-property properties of the schema semantic statements. However, expressing schema semantic statements is not limited to RDF schema notation and other notation to achieve the same may be used.

Dynamic Access Constraints

In one embodiment, a database system, such as database system 110, maintains database session data ("session data") for each database session established by the database system.

In one embodiment, a database session is established by the database system for each querier when the querier authenticates with the database system. During the database session, the querier may perform a variety of database operations such as requesting access to sensitive information. When establishing a database session, the database system may create session data containing a set of one or more attribute/value pairs. In one embodiment, the attribute/value pairs comprise data associated with the querier such as, for example, a querier/user identifier, organizational roles of the querier, groups to which the querier belongs, etc. In one embodiment, the identity of a user is established when the user is authenticated. For example, the database system may authenticate a user by comparing a username and password received from the user against a list of known usernames and passwords stored in the database.

In one embodiment, the session data maintained by a database system identifies a user individually or by one or more attributes of the user. For example, session data may comprise a unique user identifier. In addition to or instead of a unique user identifier, session data may indicate attributes of the user such as, for example, "employee", "shareholder", or "vice-president". The database system may store the session data in a computer memory for a period of time such as, for example, until a querier process or application process disconnects from a process of the database system. When a query is executed, the database system may access stored session data to identify the user or an attribute of the user making the query. Having established the identity of the user or an attribute of the user making the query, the database system may use that established identity or attribute to enforce information access policies that depend on the identity or attribute of the user.

In one embodiment, to enforce an information access policy that depends on the identity or attribute a user, an apply pattern of an access constraint is authored that uses session data. When query handling logic, such as query handling logic 120 of database system 110, receives a query to which a dynamic access constraint applies, the query handling logic will rewrite the query according to the apply pattern of the access constraint substituting the resource value in the apply pattern with a value obtained from session data as indicated by the apply pattern. To indicate in an apply pattern that a resource value in the apply pattern should be replaced at query rewriting time with a value from session data special syntax may be used. For example, in the following apply graph pattern the sys-context function in the resource value position of the apply graph pattern binds the resource value in the apply graph pattern based on the value, at query rewriting time, of the session data variable user_uri. The rewritten apply pattern in Example 11 shows an example of what the apply pattern might look like after it has been rewritten according to session data.

Access Pattern —Example 11

| Apply Pattern: | { ?contract :hasManager "sys_context ('user_uri')" ^^oradf:instuction } |
| Rewritten Apply Pattern | { ?contract :hasManager emp:Andy } |

The specialized syntax shown in the apply pattern of Example 11 is merely exemplary and embodiments of the invention are limited to any particular syntax to indicate in an apply pattern that a resource value in the apply pattern should be replaced at query rewriting time with a value from session data.

In one embodiment, session data is implemented as a dictionary data structure in which the keys to the dictionary may be used in an apply pattern to access, at query rewriting time, session data stored in the dictionary. For example, in the access pattern of Example 11, 'user_uri' is used as a key into the session data dictionary of a user who submits a query to which the apply pattern is applied. A database system, such as database system 110, may establish a session data dictionary for each user that has established a session. The session data dictionary may contain a variety of keyed values depending on the requirements of the information access policies. In one embodiment, the session data dictionary contains at least a keyed value indicating the semantic identity of the user with which the session data dictionary is associated. For example, with regard to the example rewritten apply pattern of Example 11, the session data dictionary would contain the key 'user_uri' with a value of 'emp:Andy'. A session data dictionary may also contain key values that indicate attributes of the user for which the session data dictionary has been established. The key values may indicate virtually any type of attribute of a user such as, for example, the roles of the user, the groups to which the user belongs, etc.

Often a security policy may consider the information previously accessed by the user in order to either grant or restrict access to a resource. The previously accessed information could be part of the audit records that are collected for each successful and unsuccessful user operation. In one embodiment, the audit records themselves are accessible as semantic knowledgebase, in which case, the apply pattern for an access constraint can include some patterns involving audit records to control access to a requested resource. Alternately, each user session data could maintain the summaries of the audit records as the attributes of the user in the session state and these attribute may in turn be used in the apply patterns of corresponding access constraints.

In one embodiment, in addition to or instead of attributes of the querier, session data comprises data associated with the state of the database system. Such system state data may comprises data such as, for example, the current time at the database system or the geographic location of the database system. Having established data about the state of the system, the database system may use the established data to enforce information access policies that depend on the state of the system.

For example, assume the research department of a pharmaceutical organization has developed a new beneficial drug. Further assume that the information access policy at the organization is that information about a developed drug cannot be accessed until after a specified date release time. The match pattern and apply pattern for an semantic access constraint that enforces that information access policy could be:

Match pattern:  { ?drug rdf:type :Drug }
Apply pattern:  { ?drug :DateReleaseTime ?releaseTime .
       FILTER (?releaseTime < "systimestamp( )"^^orardf:function ) }

The above example apply pattern uses the system state function systimestamp( ) in a FILTER pattern to ensure that a query obtains access to information about a drug only if the current time is later than the date release time associated with the drug.

Semantic Access Constraint Groups

In one embodiment, to aid in authoring information access policies, semantic access constraint policies may be grouped and activated or deactivated as a group based on session data. Semantic access constraint groups may be used to ensure that a semantic access constraint is applied to a user's query only for certain user sessions according session data. Semantic access constraint groups can be used to avoid duplicating structurally similar constraints. For example, consider the information access policy only a manager can access information about a contract's value. Instead of authoring a semantic access constraint for each user who is a manager, a single semantic access constraint may be authored and added to the 'manager' group. When a user's session data indicates that the user is a 'manager' then the semantic access constraints grouped in the 'manger' semantic access constraint group are activated for all user sessions involving users with a manager role as indicated by session data.

In one embodiment, information access policy data such as information access policy data 501 of FIG. 5 contains data that indicates how one or more semantic access constraints are grouped in a semantic access constraint group. In one embodiment, the data that indicates how one or more semantic access constraints are group in a semantic access constraint group includes a semantic data dictionary key and a semantic data dictionary value. A database system such as database system 110 can use that data to inspect a user's session data dictionary to determine if the dictionary contains the dictionary key and dictionary value associated with the semantic access constraint group. If the user's session data dictionary does contain the dictionary key and dictionary value associated with a semantic access constraint group, then the database system activates the semantic access constraints included in the semantic access constraint group for the user's session.

Information Access Policy Enforcement (Query Rewrite)

Returning to FIG. 2, once semantic access constraints have been applied to semantic models, a database system can enforce information access policies by rewriting user queries according to the apply patterns of the semantic access constraints. Steps 205, 207, 209, and 211 correspond to the query rewriting or information access policy enforcement phase of PRISM methodology 200.

In step 205, a database system such as database system 110 receives a semantic query from a querier requesting sensitive information. In one embodiment, the sensitive information is semantic data stored as part of a semantic model stored in a semantic knowledgebase such as semantic knowledgebase 142. In one embodiment, the semantic query from the querier identifies the semantic model by a semantic model name or semantic model identifier. In one embodiment, the semantic model from which the semantic query is requesting sensitive information is associated with the user's session.

In step 207, query handling logic of the database system such as query handling logic 120 of database system 110 determines if one or more semantic access constraints apply to the received semantic query. In one embodiment, to make this determination, query handling logic initially identifies the basic graph patterns in the received semantic query. For each basic graph pattern in the received semantic query, query handling logic then determines whether any match pattern of the semantic access constraints activated for the received semantic query indicates that the received semantic query is attempting to access protected semantic data. In one embodiment the semantic access constraints activated for the received semantic query include the semantic access constraints of semantic access constraint groups activated based on the querier's session data.

In one embodiment, when considering the semantic access constraints to be enforced for the received semantic query, the resource class and resource property hierarchy associated with the information access policy data (e.g., policy metadata) is consulted to enforce all applicable constraints. A variable or parameter in a basic graph pattern of a received semantic query that is identified as an instance of a particular resource class results in semantic access constraints that, according to their respective match patterns, are associated with the particular resource class or super-classes thereof. A semantic access constraint associated with a particular resource property is enforced against a received semantic query when the query references the particular resource property or any resource property defined as a sub-property of the particular resource property. In one embodiment, class and resource identification of variables and parameters in a basic graph pattern of a received semantic query is based in part on policy metadata.

For purpose of illustration, assume database system 110 receives the following example semantic query requesting employees and the departments they work for:

Semantic Query—Example 12

```
SELECT ?emp ?dept
WHERE
{ ?emp :worksForDept ?dept }
```

Further, assume information access policy data 141 contains the following semantic access constraint and associated policy metadata authored to enforce the information access policy that the relationship between an employee and the research department is sensitive information:

Semantic Access Constraint—Example 12

| Match Pattern: | { ?emp rdf:type :Employee } |
| Apply Pattern: | { ?emp :worksForDept ?dept . FILTER ( ?dept != 'RESEARCH') } |

Policy Metadata—Example 12

Domain Schema Semantic Statement :worksForDept rdfs: domain :Employee According to one embodiment, in step 207, query handling logic, upon receiving the semantic query of Example 12, would identify the basic graph pattern {?emp :worksForDept ?dept} in the query. Next query handling logic would determine which match patterns of the active semantic access constraints match the basic graph pattern. Assume that the semantic access constraint of Example 12 is the only active semantic access constraint. In such case, query handling logic would use the domain schema semantic statement to determine that the variable ?emp in the semantic query of Example 12 can be bound to a resource of resource class :Employee. On that basis, query handling logic could determine that the match pattern matches the semantic query because the match pattern protects a resources that are instances of class :Employee. Returning to process 200 of FIG. 2, in step 209, the semantic query received in step 205 is rewritten according to any semantic access constraints that apply to the query. For example, the semantic query of Example 12 would be rewritten as:

Rewritten Semantic Query—Example 12

```
SELECT ?emp ?dept
WHERE
{ ?emp :worksForDept ?dept .
    FILTER ( ?dept != 'RESEARCH') }
```

In one embodiment, if multiple semantic access constraints apply to the query, then the apply patterns of the multiple semantic access constraints are combined to form a conjunctive graph pattern which is applied to received semantic query.

In step 211, query handling logic executes the rewritten semantic query against a semantic model stored in a semantic knowledgebase. The rewritten query, when executed against the semantic model, only returns information that the querier is permitted to access according to an information access policy associated with the semantic model. For example, the rewritten semantic query of Example 12 would not return any information about employees who work for the research department.

Auditing Query Logs

An organization's information access policies are likely to change over time to meet changing information needs within the organization. For example, it might be initial organizational policy to allow only a project lead to access budget information about the project. Later, it may become necessary for department vice presidents to access budget information about projects in order to execute their jobs effectively. Often, because of the large size of an organization, it is difficult for the organization to identify new information needs as they arise.

Accordingly, in one embodiment, to "close the loop" on information policy management, a database system such as database system 110 maintains query logs such as query logs 144 of database 140. The information recorded in the query logs is then used to tune information access policy. In one embodiment, the database system writes data into the query logs about each semantic query received in step 205 along with data that indicates the identity or attributes of the querier who submitted the semantic query. The query logs are further utilized to control access by identifying the information and timelines under which information has been distributed to a user.

In step 213 of process 200, the query logs are analyzed by a log analyzer to determine who is requesting what information. Any software or hardware based tool suitable for parsing and analyzing log data may be used as the log analyzer. Based on determining who is asking for what information, information access policy data is then updated to more accurately reflect the information access policies of the organization. In one embodiment, based on determining who is asking for what information, a semantic access constraint is added to an information access policy to restrict access to sensitive data. In another embodiment, based on determining who is asking for what information, a semantic access constraint is relaxed to allow a particular querier access to sensitive information.

Auditing User Operation

In one embodiment, audit records are collected for each successful and unsuccessful user operation and are further used to enforce dynamic access restrictions. For example a user's ability to access the monetary value of a contract may be predicated on his past actions, such as accessing the budget for the corresponding department in the last 24 hours. For this purpose, the access constraints may be defined to include the audit logs in their access control criteria. The audit information collected for each user operation may be part of a semantic knowledgebase or it may be stored in traditional data stored, in which case it is mapped to a virtual semantic model via the semantic mapping layer. Using semantic mapping, the audit records may be visualized as semantic data even when they are stored in alternate forms, such as relational tables. With this, the sensitive data, user's session data, and audit records may be all be used in an apply pattern of a semantic access constraint to restrict access to sensitive data conditionally based on the context as well as user's past actions. For example the following semantic access constraint can ensure that the contract value for a project is restricted if the user accessed the department's budget in the last 24 hours:

```
Match pattern:   { ?project :hasContractValue ?value }
Apply pattern:   { ?project :drivenBy ?dept .
                 OPTIONAL {   ?stmt audit:accessedBy emp:Andy .
                              ?stmt rdf:subject ?dept .
                              ?stmt rdf:predicate :hasBudget .
                              ?stmt audit:accessedAt ?accesstime
                              FILTER ( ?accesstime >
"systimestamp"^^orardf:function-1 ) }
                 FILTER (!BOUND(?accesstime) }
```

The above example semantic access constraint assumes that audit records, for each statement accessed by a user, are available as reified statements along with time of access and the identity of the user, etc. The OPTIONAL clause in access constraint will find any audit records that indicate that the : hasBudget property for the department in question was accessed by the user emp:Andy in the last 24 hours. Hence the apply pattern evaluates to true only if there is no audit record that matches this criteria.

In one embodiment, for access constraints involving aggregation of audit records, the required audit summaries are pre-computed and maintained in the session data of the querier. This session data is then used in the apply pattern to enforce access restrictions.

Example Implementing Mechanism (Hardware Overview)

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions. The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information. Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution.

Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for controlling access to sensitive information, the method comprising:
    maintaining access constraint data that can be used to control access to said sensitive information;
    wherein said access constraint data comprises match pattern data and apply pattern data;
    wherein said match pattern data represents a semantic graph pattern expression that identifies one or more basic semantic graphs of a semantic graph of said sensitive information;
    wherein said apply pattern data represents a semantic graph pattern expression to be evaluated against any basic semantic graph of the one or more basic semantic graphs before the any basic semantic graph is returned as a query result;
    receiving a semantic query requesting access to said sensitive information;
    wherein said semantic query is capable of being evaluated against a semantic graph of said sensitive information;
    based on said match pattern data, determining whether said semantic query should be constrained according to said apply pattern data;
    responsive to determining that said semantic query should be constrained according to said apply pattern data,
        rewriting said semantic query according to said apply pattern data to produce a rewritten query;
        executing said rewritten query against a database that contains said sensitive information; and
        returning any results of executing said rewritten query.

2. The computer-implemented method of claim 1, wherein said rewritten query is a semantic query.

3. The computer-implemented method of claim 1, wherein said database contains semantic data that represents a semantic model of said sensitive information.

4. The computer-implemented method of claim 1, wherein said rewritten query is a Structured Query Language (SQL) query.

5. The computer-implemented method of claim 1, wherein said database is a relational database that contains said sensitive information.

6. The computer-implemented method of claim 1, wherein said match pattern data and said apply pattern data each represent a basic graph pattern.

7. The computer-implemented method of claim 1, wherein said semantic query is a SPARQL Protocol and RDF Query Language (SPARQL) query.

8. The computer-implemented method of claim 1, wherein said access constraint data further comprises policy metadata, said policy metadata comprising a set of one or more schema semantic statements, and wherein the method further comprises:
    using said set of one or more schema semantic statements to determine, based on said match pattern data, whether said semantic query should be constrained according to said apply pattern data.

9. The computer-implemented method of claim 1, further comprising:
    maintaining session data that specifies an attribute of a querier and a value for said attribute;
    wherein said apply pattern data references said attribute; and wherein the step of rewriting said semantic query according to said apply pattern data to produce a rewritten query further comprises rewriting said semantic query to incorporate the value for said attribute.

10. The computer-implemented method of claim 1, wherein said rewritten query is a semantic query, the method further comprising:
maintaining semantic mapping data that indicates how to map said rewritten query to a native access mechanism associated with said database; and
mapping said rewritten query to said native access mechanism.

11. The computer-implemented method of claim 1, wherein said database is a relational database and said rewritten query is a Structured Query Language (SQL) query, the method further comprising:
maintaining semantic mapping data that indicates how to map said semantic query and said apply pattern data to said rewritten query;
wherein the step of rewriting said semantic query according to said apply pattern data to produce a rewritten query is based on said semantic mapping data.

12. The computer-implemented method of claim 1, further comprising:
if said semantic query should not be constrained according to said apply pattern data,
executing said semantic query against a database that contains said sensitive information; and
returning any results of executing said semantic query.

13. The computer-implemented method of claim 1, further comprising:
maintaining session data that specifies an attribute associated a state of the database system and a value for said attribute;
wherein said apply pattern data references said attribute; and
wherein the step of rewriting said semantic query according to said apply pattern data to produce a rewritten query further comprises rewriting said semantic query to incorporate the value for said attribute.

14. The method of claim 1, wherein the semantic graph is a Resource Description Framework (RDF) graph of at least the sensitive information.

15. A system for controlling access to sensitive information, the system comprising:
a processor;
a memory coupled to the processor; and
logic encoded in one or more computer readable media for:
maintaining access constraint data that can be used to control access to said sensitive information;
wherein said access constraint data comprises match pattern data and apply pattern data;
wherein said match pattern data represents a semantic graph pattern expression that identifies one or more basic semantic graphs of a semantic graph of said sensitive information;
wherein said apply pattern data represents a semantic graph pattern expression to be evaluated against any basic semantic graph of one or more basic semantic graphs before the any basic semantic graph is returned as a query result;
receiving a semantic query requesting access to said sensitive information;
wherein said semantic query is capable of being evaluated against a semantic graph of said sensitive information;
based on said match pattern data, determining whether said semantic query should be constrained according to said apply pattern data;
responsive to determining that said semantic query should be constrained according to said apply pattern data, rewriting said semantic query according to said apply pattern data to produce a rewritten query;
executing said rewritten query against a database that contains said sensitive information; and
returning any results of executing said rewritten query.

16. The system of claim 15, wherein said rewritten query is a semantic query.

17. The system of claim 15, wherein said database contains semantic data that represents a semantic model of said sensitive information.

18. The system of claim 15, wherein said rewritten query is a Structured Query Language (SQL) query.

19. The system of claim 15, wherein said database is a relational database that contains said sensitive information.

20. The system of claim 15, wherein said match pattern data and said apply pattern data each represent a basic graph pattern.

21. The system of claim 15, wherein said semantic query is a SPARQL Protocol and RDF Query Language (SPARQL) query.

22. The system of claim 15, wherein said access constraint data further comprises policy metadata, said policy metadata comprising a set of one or more schema semantic statements, and wherein the system further comprises:
logic for using said set of one or more schema semantic statements to determine, based on said match pattern data, whether said semantic query should be constrained according to said apply pattern data.

23. The system of claim 15, further comprising:
logic for maintaining session data that specifies an attribute of a querier and a value for said attribute;
wherein said apply pattern data references said attribute; and
wherein the logic for rewriting said semantic query according to said apply pattern data to produce a rewritten query further comprises logic for rewriting said semantic query to incorporate the value for said attribute.

24. The system of claim 15, wherein said rewritten query is a semantic query, the system further comprising:
logic for maintaining semantic mapping data that indicates how to map said rewritten query to a native access mechanism associated with said database; and
logic for mapping said rewritten query to said native access mechanism.

25. The system of claim 15, wherein said database is a relational database and said rewritten query is a Structured Query Language (SQL) query, the system further comprising:
logic for maintaining semantic mapping data that indicates how to map said semantic query and said apply pattern data to said rewritten query;
wherein the logic for rewriting said semantic query according to said apply pattern data to produce a rewritten query further comprises logic for rewriting said semantic query based on said semantic mapping data.

26. The system of claim 15, further comprising:
logic operable where said semantic query should not be constrained according to said apply pattern data for,
executing said semantic query against a database that contains said sensitive information; and
returning any results of executing said semantic query.

27. The system of claim 15, further comprising:
- logic for maintaining session data that specifies an attribute associated a state of the system and a value for said attribute;
- wherein said apply pattern data references said attribute; and
- wherein the logic for rewriting said semantic query according to said apply pattern data to produce a rewritten query further comprises logic for rewriting said semantic query to incorporate the value for said attribute.

28. One or more non-transitory computer-readable media storing instructions which, when executed by one or more computing devices, cause performance of a method comprising:
- maintaining access constraint data that can be used to control access to said sensitive information;
- wherein said access constraint data comprises match pattern data and apply pattern data;
- wherein said match pattern data represents a semantic graph pattern expression that identifies one or more basic semantic graphs of a semantic graph of said sensitive information;
- wherein said apply pattern data represents a semantic graph pattern expression to be evaluated against any basic semantic graph of the one or more basic semantic graphs before the any basic semantic graph is returned as a query result;
- receiving a semantic query requesting access to said sensitive information;
- wherein said semantic query is capable of being evaluated against a semantic graph of said sensitive information;
- based on said match pattern data, determining whether said semantic query should be constrained according to said apply pattern data;
- responsive to determining that said semantic query should be constrained according to said apply pattern data,
  - rewriting said semantic query according to said apply pattern data to produce a rewritten query;
  - executing said rewritten query against a database that contains said sensitive information; and
  - returning any results of executing said rewritten query.

29. The one or more non-transitory computer-readable media of claim 28, wherein said rewritten query is a semantic query.

30. The one or more non-transitory computer-readable media of claim 28, wherein said database contains semantic data that represents a semantic model of said sensitive information.

31. The one or more non-transitory computer-readable media of claim 28, wherein said rewritten query is a Structured Query Language (SQL) query.

32. The one or more non-transitory computer-readable media of claim 28, wherein said database is a relational database that contains said sensitive information.

33. The one or more non-transitory computer-readable media of claim 28, wherein said match pattern data and said apply pattern data each represent a basic graph pattern.

34. The one or more non-transitory computer-readable media of claim 28, wherein said semantic query is a SPARQL Protocol and RDF Query Language (SPARQL) query.

35. The one or more non-transitory computer-readable media of claim 28, wherein said access constraint data further comprises policy metadata, said policy metadata comprising a set of one or more schema semantic statements, and wherein the method further comprises:
- using said set of one or more schema semantic statements to determine, based on said match pattern data, whether said semantic query should be constrained according to said apply pattern data.

36. The one or more non-transitory computer-readable media of claim 28, the method further comprising:
- maintaining session data that specifies an attribute of a querier and a value for said attribute;
- wherein said apply pattern data references said attribute; and
- wherein the step of rewriting said semantic query according to said apply pattern data to produce a rewritten query further comprises rewriting said semantic query to incorporate the value for said attribute.

37. The one or more non-transitory computer-readable media of claim 28, wherein said rewritten query is a semantic query, the method further comprising:
- maintaining semantic mapping data that indicates how to map said rewritten query to a native access mechanism associated with said database; and
- mapping said rewritten query to said native access mechanism.

38. The one or more non-transitory computer-readable media of claim 28, wherein said database is a relational database and said rewritten query is a Structured Query Language (SQL) query, the method further comprising:
- maintaining semantic mapping data that indicates how to map said semantic query and said apply pattern data to said rewritten query;
- wherein the step of rewriting said semantic query according to said apply pattern data to produce a rewritten query is based on said semantic mapping data.

39. The one or more non-transitory computer-readable media of claim 28, the method further comprising:
- if said semantic query should not be constrained according to said apply pattern data,
  - executing said semantic query against a database that contains said sensitive information; and
  - returning any results of executing said semantic query.

40. The one or more non-transitory computer-readable of claim 28, the method further comprising:
- maintaining session data that specifies an attribute associated a state of the database system and a value for said attribute;
- wherein said apply pattern data references said attribute; and
- wherein the step of rewriting said semantic query according to said apply pattern data to produce a rewritten query further comprises rewriting said semantic query to incorporate the value for said attribute.

* * * * *

UNITED STATES PATENT AND TRADEMARK OFFICE
CERTIFICATE OF CORRECTION

| | | |
|---|---|---|
| PATENT NO. | : 8,285,748 B2 | |
| APPLICATION NO. | : 12/472016 | |
| DATED | : October 9, 2012 | |
| INVENTOR(S) | : Thomas et al. | |

It is certified that error appears in the above-identified patent and that said Letters Patent is hereby corrected as shown below:

In column 3, line 35, delete "(HIPPA)." and insert -- (HIPAA). --, therefor.

In column 9, line 44, delete "(HIPPA)," and insert -- (HIPAA), --, therefor.

In column 15, line 20, delete ":<classs>" and insert -- :<class> --, therefor.

In column 22, line 9, delete "Proj ect." and insert -- Project. --, therefor.

In column 23, line 3, delete "Pro j ect." and insert -- Project. --, therefor.

In column 24, line 46, delete "sys-context" and insert -- sys_context --, therefor.

In column 24, line 59, delete "instuction" and insert -- instruction --, therefor.

In column 26, line 12, delete "'manger'" and insert -- 'manager' --, therefor.

In column 36, line 47, in claim 40, after "computer-readable" insert -- media --.

Signed and Sealed this
Eighth Day of January, 2013

David J. Kappos
*Director of the United States Patent and Trademark Office*